(12) United States Patent
Christensen (10) Patent No.: US 10,293,934 B2
(45) Date of Patent: May 21, 2019

(54) DUAL-AIRCRAFT SYSTEM

(71) Applicant: Nicholas K. Christensen, Satellite Beach, FL (US)

(72) Inventor: Nicholas K. Christensen, Satellite Beach, FL (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 355 days.

(21) Appl. No.: 15/066,460

(22) Filed: Mar. 10, 2016

(65) Prior Publication Data

US 2017/0259918 A1    Sep. 14, 2017

(51) Int. Cl.
*B64C 31/02* (2006.01)
*B64C 39/02* (2006.01)
*B64D 5/00* (2006.01)

(52) U.S. Cl.
CPC .......... *B64C 31/02* (2013.01); *B64C 39/024* (2013.01); *B64D 5/00* (2013.01); *B64C 2201/021* (2013.01); *B64C 2201/027* (2013.01); *B64C 2201/082* (2013.01); *B64C 2201/086* (2013.01); *B64C 2201/104* (2013.01); *B64C 2201/108* (2013.01); *B64C 2201/162* (2013.01); *B64C 2201/206* (2013.01)

(58) Field of Classification Search
CPC .......... B64D 1/02; B64C 11/00; B64C 31/02; B64C 39/024; B64C 2201/024; B64C 2201/082; B64C 2201/206
USPC ........................................................ 244/2
See application file for complete search history.

(56) References Cited

U.S. PATENT DOCUMENTS

| | | | | |
|---|---|---|---|---|
| 1,779,855 A | * | 10/1930 | Roche | B64D 5/00 244/16 |
| 2,385,392 A | * | 9/1945 | Van Dusen | B64D 3/00 244/3 |
| 2,399,217 A | * | 4/1946 | Fahrney | B64D 5/00 244/16 |
| 2,612,327 A | * | 9/1952 | Carlson | B64D 3/02 244/3 |
| 2,843,337 A | * | 7/1958 | Bennett | B64D 5/00 244/2 |
| 3,113,747 A | * | 12/1963 | Smith | B64D 5/00 244/3 |
| 4,248,394 A | * | 2/1981 | Klumpp | B64D 3/00 244/16 |

(Continued)

*Primary Examiner* — Richard R. Green
*Assistant Examiner* — Brady W Frazier
(74) *Attorney, Agent, or Firm* — Tarolli, Sundheim, Covell & Tummino LLP (57) ABSTRACT

One example includes a dual-aircraft system. The system includes a glider aircraft configured to perform at least one mission objective in a gliding-flight mode during a mission objective stage. The system also includes an unmanned singlecopter configured to couple to the glider aircraft via a mechanical linkage to provide propulsion for the glider aircraft during a takeoff and delivery stage. The unmanned singlecopter can be further configured to decouple from the glider aircraft during a detach stage in response to achieving at least one of a predetermined altitude and a predetermined geographic location to provide the gliding-flight mode associated with the glider aircraft, such that the glider aircraft subsequently enters the mission objective stage.

10 Claims, 4 Drawing Sheets

(56) References Cited

U.S. PATENT DOCUMENTS

| | | | |
|---|---|---|---|
| 4,267,987 A * | 5/1981 | McDonnell | B64D 39/00 244/137.4 |
| 4,678,141 A * | 7/1987 | Sarrantonio | B64C 37/02 244/2 |
| 4,757,959 A * | 7/1988 | Schroder | B64D 3/00 244/137.4 |
| 4,824,047 A * | 4/1989 | Chadwick | B64D 5/00 244/16 |
| 5,000,398 A * | 3/1991 | Rashev | B64C 27/08 244/110 E |
| 5,188,313 A * | 2/1993 | Piasecki | B64C 37/02 114/246 |
| 6,691,949 B2 * | 2/2004 | Plump | B64C 29/02 244/12.2 |
| 7,357,352 B2 * | 4/2008 | Speer | B64C 39/024 244/2 |
| 8,740,134 B2 | 6/2014 | Suzuki | |
| 8,910,902 B2 * | 12/2014 | Speer | B64D 3/02 244/1 TD |
| 8,950,698 B1 * | 2/2015 | Rossi | B64C 37/02 244/2 |
| 9,022,322 B2 | 5/2015 | Westbrook, Sr. | |
| 9,359,075 B1 * | 6/2016 | Von Flotow | B64D 5/00 |
| 2009/0294573 A1 * | 12/2009 | Wilson | B64C 39/024 244/2 |
| 2010/0193625 A1 * | 8/2010 | Sommer | B64C 37/02 244/2 |
| 2011/0049288 A1 * | 3/2011 | Suzuki | B64C 37/02 244/2 |
| 2012/0091259 A1 * | 4/2012 | Morris | B64C 27/02 244/17.13 |
| 2012/0232721 A1 * | 9/2012 | Engblom | B64C 37/02 701/3 |
| 2013/0037650 A1 * | 2/2013 | Heppe | B64B 1/54 244/2 |
| 2013/0200207 A1 | 8/2013 | Pongratz et al. | |
| 2014/0158812 A1 * | 6/2014 | Luther | B64C 39/10 244/2 |
| 2015/0021428 A1 * | 1/2015 | Rutan | B64G 1/005 244/3 |
| 2015/0353197 A1 * | 12/2015 | Alber | B64D 5/00 244/2 |
| 2016/0297520 A1 * | 10/2016 | Sada-Salinas | B64C 29/0025 |

* cited by examiner

DUAL-AIRCRAFT SYSTEM

TECHNICAL FIELD

The present invention relates generally to aviation, and specifically to a dual-aircraft system.

BACKGROUND

For many decades, aircraft have been implemented for a variety of uses as means of transportation, reconnaissance, and warfare. Different types of aircraft have been historically implemented for different purposes. One use of aircraft is to accomplish defined mission objectives, such as communications or monitoring contested areas in a military application. As an example, providing communication and/or area monitoring can provide necessary intelligence to ensure safety military and support personnel. As some flight operations became increasingly more dangerous or tedious, unmanned aerial vehicles (UAV) have been developed as a means for replacing pilots in the aircraft for controlling the aircraft. Thus, pilots can remain safe during a hazardous operation that could place an aircraft in the reach of a cyber and kinetic attack in a militarily contested area.

SUMMARY

One example includes a dual-aircraft system. The system includes a glider aircraft configured to perform at least one mission objective in a gliding-flight mode during a mission objective stage. The system also includes an unmanned singlecopter configured to couple to the glider aircraft via a mechanical linkage to provide propulsion for the glider aircraft during a takeoff and delivery stage. The unmanned singlecopter can be further configured to decouple from the glider aircraft during a detach stage in response to achieving at least one of a predetermined altitude and a predetermined geographic location to provide the gliding-flight mode associated with the glider aircraft, such that the glider aircraft subsequently enters the mission objective stage.

Another example includes a method for performing an aerial mission. The mission includes providing propulsion of a dual-aircraft system via an unmanned singlecopter associated with the dual-aircraft system that is mechanically coupled to a glider aircraft associated with the dual-aircraft system during a takeoff and delivery stage. The mission also includes decoupling the glider aircraft from the unmanned singlecopter during a detach stage in response to achieving at least one of a predetermined altitude and a predetermined geographic location. The mission also includes performing at least one mission objective in a gliding-flight mode associated with the glider aircraft during a mission objective stage. The mission further includes providing one of unidirectional and bidirectional communication between the glider aircraft and a base-station during the mission objective stage.

Another example includes a dual-aircraft system. The system includes a glider aircraft comprising a glider control system comprising a mission objective controller, a situational awareness (SA) sensor system configured to generate SA data, and a transceiver. The glider aircraft can be configured to perform at least one mission objective in a gliding-flight mode during a mission objective stage based on the mission objective controller and to transmit SA data via the transceiver. The system also includes a unmanned singlecopter configured to couple to the glider aircraft via a mechanical linkage to provide propulsion for the glider aircraft during a takeoff and delivery stage. The unmanned singlecopter can be further configured to decouple from the glider aircraft during a detach stage in response to achieving at least one of a predetermined altitude and a predetermined geographic location to provide the gliding-flight mode associated with the glider aircraft, such that the glider aircraft subsequently enters the mission objective stage. The unmanned singlecopter can be further configured to travel to a location associated with the glider aircraft and to mechanically reattach to the glider aircraft during a reattach stage in response to at least one of completion of the at least one mission objective and the glider aircraft achieving a critical altitude based on receiving the SA data associated with the glider aircraft.

DETAILED DESCRIPTION

The present invention relates generally to aviation, and specifically to a dual-aircraft system. The dual-aircraft system can include a glider aircraft and an unmanned singlecopter that are implemented to operate together to accomplish mission objectives. As an example, during a takeoff and delivery stage, the unmanned singlecopter and the glider aircraft can be coupled together via a mechanical linkage, such that the unmanned singlecopter can provide propulsion of the dual-aircraft system. In response to achieving at least one of a predetermined altitude and a predetermined geographic location (e.g., a location associated with one or more mission objectives), the dual-aircraft system can enter a detach stage at which the glider aircraft can separate from the unmanned singlecopter to operate in a gliding-flight mode of operation. During the gliding-flight mode of operation, the dual-aircraft system can enter a mission objective stage during which the glider aircraft can perform one or more mission objectives, such as reconnaissance, communications, and/or the delivery of ordnance. As an example, the glider aircraft can maintain communicative contact with at least one base-station during the mission objective stage to provide for transmission of mission objective data to the glider aircraft and/or the transmission of situational awareness (SA) data from the glider aircraft.

During the mission objective stage, the unmanned singlecopter can perform additional mission objective(s), or can operate in a hover or perch mode. As an example, during the mission objective stage, the unmanned singlecopter can maintain communicative contact with the glider aircraft, such that the unmanned singlecopter can receive SA data from the glider aircraft. In response to the glider aircraft accomplishing the mission objective(s) and/or achieving a critical altitude, such as provided via the SA data to the unmanned singlecopter, the dual-aircraft system can enter a reattach stage. During the reattach stage, the unmanned singlecopter can travel to the location of the glider aircraft and can mechanically reattach to the glider aircraft. Thus, the unmanned singlecopter can again provide propulsion for the dual-aircraft system, such that the unmanned singlecopter can provide lift to bring the dual-aircraft system back to a specific altitude and/or geographic location to detach the glider aircraft and begin another mission objective stage, or can provide propulsion of the dual-aircraft system back to a predetermined landing site.

Figure 1:
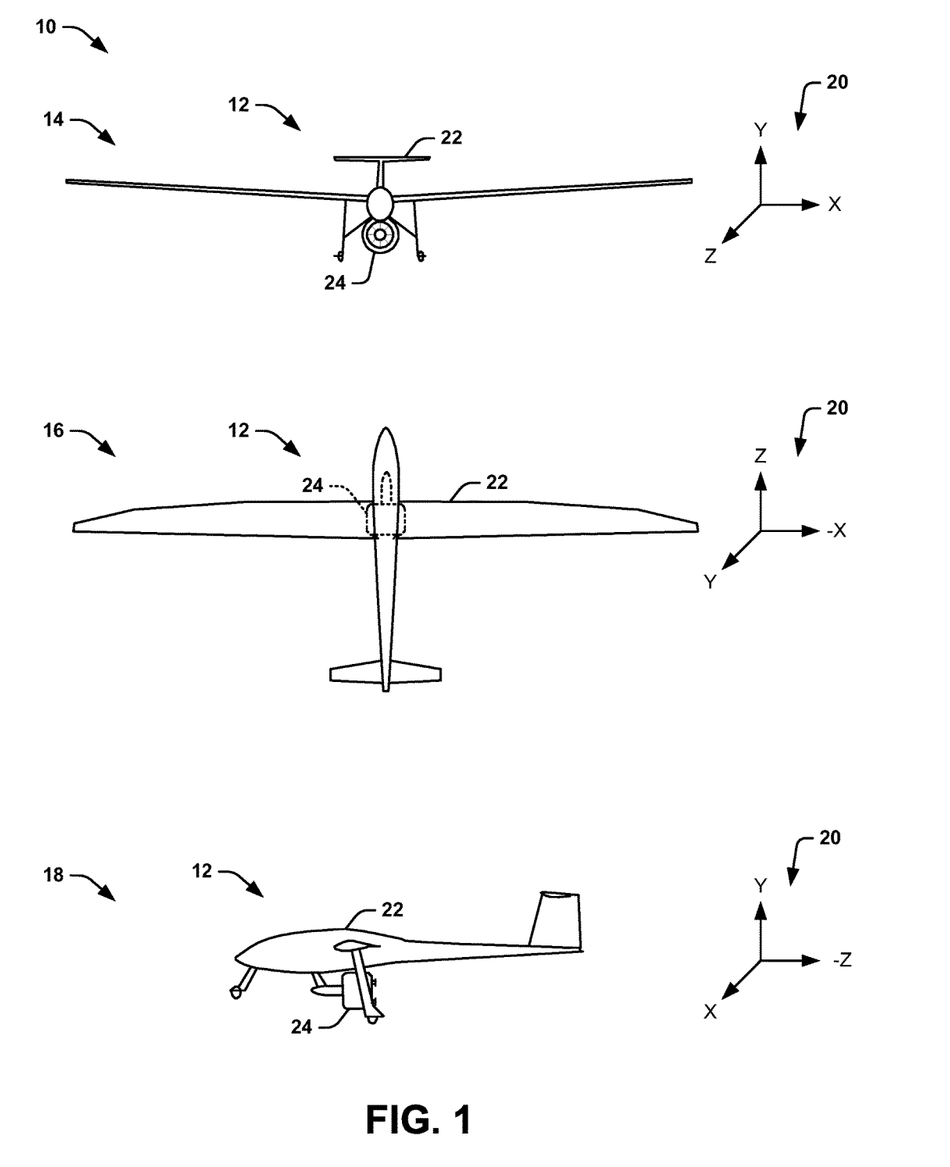
FIG. 1 illustrates an example diagram of a dual-aircraft system.

FIG. 1 illustrates an example diagram 10 of a dual-aircraft system 12. The dual-aircraft system 12 is demonstrated in the example of FIG. 1 in a first view at 14, in a second view at 16, and in a third view at 18, with each of the views 14, 16, and 18 being associated with different views in three-dimensional Cartesian coordinate space, as demonstrated at 20 in each of the different views. In the example of FIG. 1, the first view 14 corresponds to a front-view of the dual-aircraft system 12, the second view 16 corresponds to a top-view of the dual-aircraft system 12, and the third view 18 corresponds to a side-view of the dual-aircraft system 12.

The dual-aircraft system 12 includes a glider aircraft 22 and an unmanned singlecopter 24. As described in greater detail herein, the term "dual-aircraft system" is used to describe both the glider aircraft 22 and the singlecopter 24 in both an attached and an unattached (e.g., detached) state. As an example, the glider aircraft 22 can likewise be configured as an unmanned aerial vehicle (UAV), such that the dual-aircraft system 12 collectively corresponds to an unmanned vehicle. As described herein, the term "singlecopter" describes a vertical takeoff and landing (VTOL) aircraft that includes a single rotor. The singlecopter 24 can achieve thrust based on the single rotor in a horizontal orientation to achieve level-flight and in a vertical orientation to achieve hovering. As an example, the singlecopter 24 can be configured to navigate in either a level-flight mode or a hover mode based on cyclic pitch control and/or flaps. As an example, the singlecopter 24 can include an outer shroud that encloses at least a portion of the rotor and engine, as well as at least a portion of the electronic control system.

The singlecopter 24 can be mechanically coupled to the glider aircraft 22 via a mechanical linkage As an example, the singlecopter 24 can be mechanically coupled to the glider aircraft 22 via the mechanical linkage demonstrated in the example of FIG. 1 in an initial state, such as in preparation for takeoff of the dual-aircraft system 12. The mechanical linkage can for example, be associated with mechanical components on both the singlecopter 24 and the glider aircraft 22 that are configured to mate with each other. For example, the singlecopter 24 can include a plurality of separate mechanical linkage components at regular intervals about the periphery of the outer shroud to facilitate ease in reattachment of the singlecopter 24 to the glider aircraft 22, as described in greater detail herein. In the example of FIG. 1, the singlecopter 24 is coupled to an undercarriage associated with the glider aircraft 22. However, it is to be understood that the singlecopter 24 could be mechanically coupled to the glider aircraft 22 in a variety of other ways. As an example, the singlecopter 24 could instead be coupled to the glider aircraft 22 via a mechanical linkage that is on a top surface of the glider aircraft 22. As another example, the glider aircraft 22 can include one or more tethers, such that the singlecopter 24 can couple to the glider aircraft 22 via the tether(s) during a reattach stage, as described in greater detail herein.

Therefore, based on the mechanical coupling of the singlecopter 24 to the glider aircraft 22, the singlecopter 24 can implement propulsion for the dual-aircraft system 12 to provide level-flight for the dual-aircraft system 12. Thus, during a takeoff and delivery stage of a mission associated with the dual-aircraft system 12, the dual-aircraft system 12 can take off (e.g., from a runway via wheels of the glider aircraft 22) and can achieve lift via wings associated with the glider aircraft 22 based on the thrust provided via the singlecopter 24. Thus, after takeoff, the dual-aircraft system 12 can fly toward a mission objective during the takeoff and delivery stage based on the propulsion provided by the singlecopter 24 as mechanically-attached to the glider aircraft 22.

In response to achieving at least one of a predetermined altitude and a predetermined geographic location (e.g., an approximate location of at least one mission objective), the singlecopter 24 can detach from the glider aircraft 22 during a detach stage. As an example, the detach stage can be based on situational awareness data associated with at least one of the glider aircraft 22 and the singlecopter 24, such as based on a known altitude or coordinate space (e.g., based on a global navigate satellite system (GNSS)). As another example, at least one of the glider aircraft 22 and the singlecopter 24 can maintain contact with a base-station (e.g., based on a wireless signal directly or indirectly to the base-station or via a satellite-based communication signal), such that the base-station can command detachment of the singlecopter 24 from the glider aircraft 22. After the detach stage, the dual-aircraft system 12, as the separate components of the singlecopter 24 and the glider aircraft 22, can enter the mission objective stage. During the mission objective stage, the glider aircraft 22 can loiter or fly in a gliding-flight mode, and thus unassisted by any form of active (e.g., motorized or fuel-based) propulsion, while performing at least one mission objective. The mission objective(s) can include, for example, at least one of video surveillance, imaging (e.g., radar or lidar), communications (e.g., as an intermediate communications relay), and/or ordnance delivery. For example, the base-station can be configured to transmit mission objective control data to the glider aircraft 22, such as to control performance of the mission objective(s).

During the mission objective stage, the singlecopter 24 can engage in a number of activities. As one example, the singlecopter 24 can hover in place during the mission objective stage, such as to maintain substantially close proximity with respect to the glider aircraft 22. As another example, the singlecopter 24 can perch. As described herein, the term "perch" with respect to the singlecopter 24 refers to the singlecopter 24 landing (e.g., vertically), such as on the ground or on an elevated terrain (e.g., a mountain, hill, or building) to facilitate rapid ascent during a reattach phase, as described herein. As yet another example, the singlecopter 24 can be configured to perform other mission objective(s), such as while hovering or perching, or while flying in a pattern or to another predetermined geographic location. The mission objective(s) performed by the singlecopter 24 can be substantially similar to any of a variety of mission objectives similar to as described previously with respect to the glider aircraft 22 (e.g., video surveillance, imaging, communications, and/or ordnance delivery).

As an example, the glider aircraft 22 can maintain wireless contact with at least one of the base-station and the singlecopter 24 during the mission objective stage. For example, the glider aircraft 22 can transmit situational awareness (SA) data via a transceiver during the mission objective stage. As an example, the SA data can include data associated with the mission objective(s), such as indicative of progress, and/or can include navigation data associated with the glider aircraft 22 (e.g., altitude, coordinates, etc.). Thus, the glider aircraft 22 can provide an indication of completion of the mission objective(s) and/or of having achieved a critical altitude at which a crash of the glider aircraft 22 is imminent without rapid attention via a wireless signal to at least one of the base-station and the singlecopter 24. Therefore, the singlecopter 24 can receive the SA data from the glider aircraft 22, either directly or via the base-station, and can implement the reattach stage. During the reattach stage, the singlecopter 24 can travel to the location of the glider aircraft 22 and can mechanically reattach to the glider aircraft 22. As a first example, the singlecopter 24 can reattach to the glider aircraft 22 via the mechanical linkage, such as the same mechanical linkage through which the glider aircraft 22 and the singlecopter 24 were attached during the takeoff and delivery stage. As a second example, the glider aircraft 22 can include one or more tethers to which the singlecopter 24 can mechanically attach (e.g., via a mechanical means) to physically grab the tether(s).

Accordingly, the singlecopter 24 can again provide propulsion for the dual-aircraft system 12 during the reattach stage. As an example, the singlecopter 24 can again provide the propulsion for the dual-aircraft system 12 to lift the dual-aircraft system 12 to a subsequent predetermined altitude and/or to transport the dual-aircraft system 12 to a subsequent predetermined geographic location. In response to the dual-aircraft system 12 achieving at least one of the subsequent predetermined altitude and the subsequent predetermined geographic location, the singlecopter 24 can once again detach from the glider aircraft 22 during a subsequent detach stage. Therefore, the glider aircraft 22 can again proceed in a gliding-flight mode to implement the mission objective stage. Accordingly, the dual-aircraft system 12 can substantially repeatedly perform one or more mission objectives based on repeatedly implementing the detach stage, the mission objective stage, and the reattach stage. As another example, upon reattachment of the singlecopter 24 to the glider aircraft 22 during the reattach stage, the singlecopter 24 can provide propulsion of the dual-aircraft system 12 to a predetermined landing site, and thus conclude the mission of the dual-aircraft system 12. As yet another example, based on the parameters of the mission objectives and/or the degree of danger, and because the glider aircraft 22 can be designed and manufactured to be significantly cost-effective, and thus expendable, the glider aircraft 22 can be sacrificed upon completion of the mission objective(s), such that the singlecopter 24 can be commanded to return to the landing site upon detaching from the glider aircraft 22 during the detach stage.

The dual-aircraft system 12 can thus be implemented in a variety of aerial missions in a manner that is more advantageous than typical intelligence, surveillance, and reconnaissance (ISR) missions, or even combat missions. As an example, because the dual-aircraft system 12 can be composed of the glider aircraft 12 and the singlecopter 24 that are both configured as UAVs, the aerial mission can be conducted in a manner that is safe for pilots. As another example, the dual-aircraft system 12 can operate at an extended range relative to other ISR missions, such as based on utilizing the singlecopter 24 to deploy the glider aircraft 22 at a significant distance from a fixed based, with the glider aircraft 22 travelling a significant distance beyond the location of the detachment of the singlecopter 24 to perform the mission objectives. As yet another example, because the glider aircraft 22 operates independently of a propulsion mechanism during the mission objective stage, the glider aircraft 22 can evade detection based on silently flying in the gliding-flight mode. Furthermore, the design and/or construction of the glider aircraft 22 and the singlecopter 24 can be significantly more cost-effective than typical self-propelled aircraft. Accordingly, the dual-aircraft system 12 can exhibit a number of advantages over typical ISR or combat operational aircraft.

Based on the use of the singlecopter 24 (e.g., including a shroud) to provide propulsion for the dual-aircraft system 12, the dual-aircraft system 12 can exhibit substantially improved aerodynamic capabilities during the takeoff and delivery stage based on the close-coupling of the singlecopter 24 to the fuselage of the glider aircraft 22, as opposed to typical glider systems that implement a towed glider aircraft system."

Figure 2:
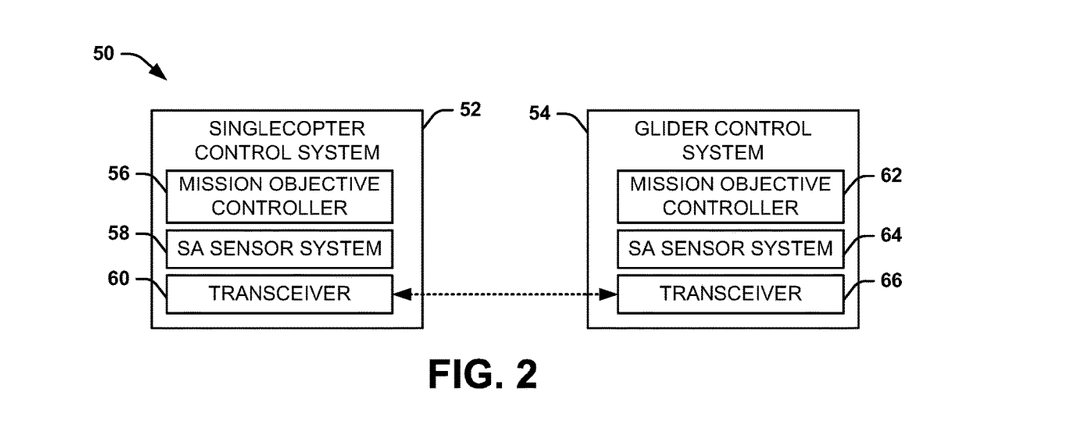
FIG. 2 illustrates an example diagram of control systems of a dual-aircraft system.

FIG. 2 illustrates an example diagram 50 of control systems of the dual-aircraft system 12. The diagram 50 demonstrates a singlecopter control system 52 that resides on the singlecopter 24 and a glider control system 54 that resides on the glider aircraft 22. Therefore, because the singlecopter control system 52 is associated with the singlecopter 24 and the glider control system 54 is associated with the glider aircraft 22, reference is to be made to the example of FIG. 1 in the following description of the example of FIG. 2.

The singlecopter control system 52 includes a mission objective controller 56, an SA sensor system 58, and a transceiver 60. The mission objective controller 56 can correspond to an electronic control system configured to provide navigation controls associated with the singlecopter 24. As an example, the mission objective controller 56 can be configured to implement navigation controls for the singlecopter 24 individually while the singlecopter 24 is detached from the glider aircraft 22. For example, the mission objective controller 56 can dictate the navigation controls for the singlecopter 24 to hover, perch, or to complete mission objectives during the mission objective stage. The SA sensor system 58 can correspond to a set of sensors configured to ascertain SA data (e.g., altitude, coordinates, imminent threats, objectives, etc.) associated with the singlecopter 24. Therefore, the mission objective controller 56 can be configured to provide the navigation controls based on the SA data generated by the SA sensor system 58.

As an example, the transceiver 60 can be configured to maintain wireless (e.g., radio-frequency (RF)) communication with the base-station, such that the singlecopter 24 can be remotely controlled, such as via a user at the base-station. Thus, the transceiver 60 can transmit the SA data generated by the SA sensor system 58 to the base-station. Therefore, the mission objective controller 56 can be responsive to the user-provided navigation controls that are received via the transceiver 60 based on the SA data. As another example, the singlecopter 24 can be configured as an autonomous vehicle, such that the mission objective controller 56 can include a memory configured to store mission objective data that can dictate the navigation controls based on the SA data generated by the SA sensor system 58. Therefore, the mission objective controller 56 can implement a program to control the singlecopter 24 while the singlecopter 24 is detached from the glider aircraft 22 based on the SA data generated by the SA sensor system 58.

The glider control system 54 includes a mission objective controller 62, an SA sensor system 64, and a transceiver 66. The mission objective controller 62 can correspond to an electronic control system configured to provide navigation controls associated with the glider aircraft 22 while the glider aircraft 22 is in the gliding-flight mode, and thus while the singlecopter 24 is detached from the glider aircraft 22. As an example, the mission objective controller 62 can be configured to implement the navigation controls for the glider aircraft 22 for controlling the glider aircraft 22 individually while the singlecopter 24 is detached from the glider aircraft 22, and thus while the glider aircraft 22 loiters or flies while performing mission objectives. Additionally, the mission objective controller 62 can also define the mission objectives to be performed by the glider aircraft 22 during the mission objective stage (e.g., video surveillance, imaging, communications, and/or ordnance delivery). The SA sensor system 64 can correspond to a set of sensors configured to ascertain SA data (e.g., altitude, coordinates, imminent threats, objectives, etc.) associated with the glider aircraft 22. Therefore, the mission objective controller 62 can be configured to provide the navigation controls based on the SA data generated by the SA sensor system 64.

As an example, the transceiver 66 can be configured to maintain wireless (e.g., radio-frequency (RF)) communication with the base-station, such that the glider aircraft 22 can be remotely controlled, such as via a user at the base-station. Thus, the transceiver 66 can transmit the SA data generated by the SA sensor system 64 to the base-station. Therefore, the mission objective controller 62 can be responsive to the user-provided navigation controls that are received via the transceiver 66 based on the SA data. As another example, the glider aircraft 22 can be configured as an autonomous vehicle, such that the mission objective controller 62 can include a memory configured to store mission objective data that can dictate the navigation and/or mission objective controls based on the SA data generated by the SA sensor system 64. Therefore, the mission objective controller 62 can implement a program to control the glider aircraft 22 while the singlecopter 24 is detached from the glider aircraft 22 based on the SA data generated by the SA sensor system 64.

In addition, in the example of FIG. 2, the transceiver 60 of the singlecopter control system 52 and the transceiver 66 of the glider control system 54 are demonstrated in communicative contact (e.g., wirelessly) based on a bidirectional arrow 68. Therefore, the mission objective controller 56 of the singlecopter control system 52 and the mission objective controller 62 of the glider control system 54 can cooperate to control the dual-aircraft system 12 while the singlecopter 24 is mechanically attached to the glider aircraft 22, such as during the takeoff and delivery stage or subsequent to the reattach stage. Therefore, one or both of the transceivers 60 and 66 can transmit the SA data generated by one or both of the SA sensor systems 58 and 64 to the base-station, such that the base-station can provide navigation controls via transmission to one or both of the transceivers 60 and 66. As a result, the mission objective controller 56 can be configured to control the thrust/propulsion associated with the dual-aircraft system 12 while the mission objective controller 62 can be configured to control steering and yaw/pitch/roll associated with the dual-aircraft system 12. Alternatively, in the example of the dual-aircraft system 12 being configured as an autonomous vehicle, the mission objective control systems 56 and 62 can identify when the singlecopter 24 is attached to the glider aircraft 22 (e.g., based on the SA data generated by one or both of SA sensor systems 58 and 64), such that the mission objective controllers 56 and 62 can cooperate to navigate the dual-aircraft system 12 based on the communication between the transceivers 60 and 66.

FIGS. 3-6 demonstrate the various stages of a mission associated with the dual-aircraft system 12. The dual-aircraft system 12 thus includes the glider aircraft 22 and the singlecopter 24. Accordingly, reference is to be made to the example of FIGS. 1 and 2 in the following description of the examples of FIGS. 3-7.

Figure 3:
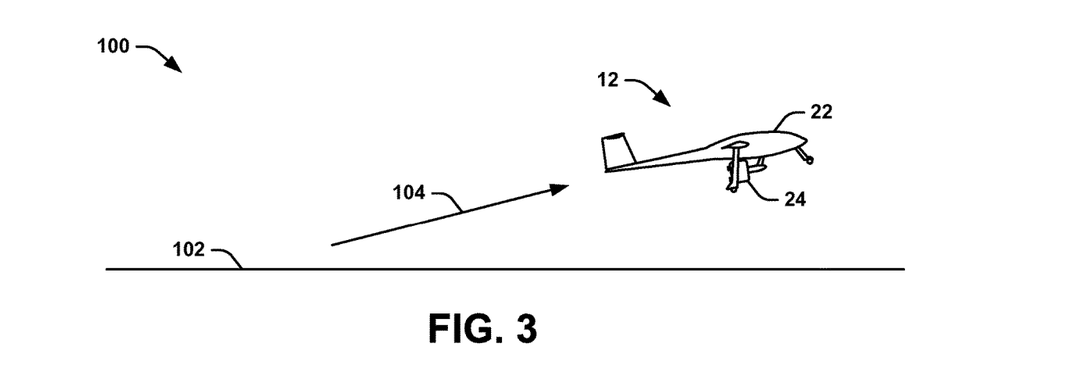
FIG. 3 illustrates an example diagram of a first stage of an aerial mission.

FIG. 3 illustrates an example diagram 100 of a first stage of an aerial mission. In the example of FIG. 3, the first stage can correspond to a takeoff and delivery stage. During the takeoff and delivery stage, the singlecopter 24 can be coupled to the glider aircraft 22 via the mechanical coupling. Therefore, the singlecopter 24 can implement propulsion for the dual-aircraft system 12 to provide level-flight for the dual-aircraft system 12. Accordingly, the dual-aircraft system 12 can take off from a runway 102 via wheels of the glider aircraft 22 and can achieve lift via wings associated with the glider aircraft 22 based on the thrust provided via the singlecopter 24, demonstrated based on the arrow 104. Thus, after takeoff, the dual-aircraft system 12 can fly toward a mission objective during the takeoff and delivery stage based on the propulsion provided by the singlecopter 24 as mechanically-attached to the glider aircraft 22.

Figure 4:
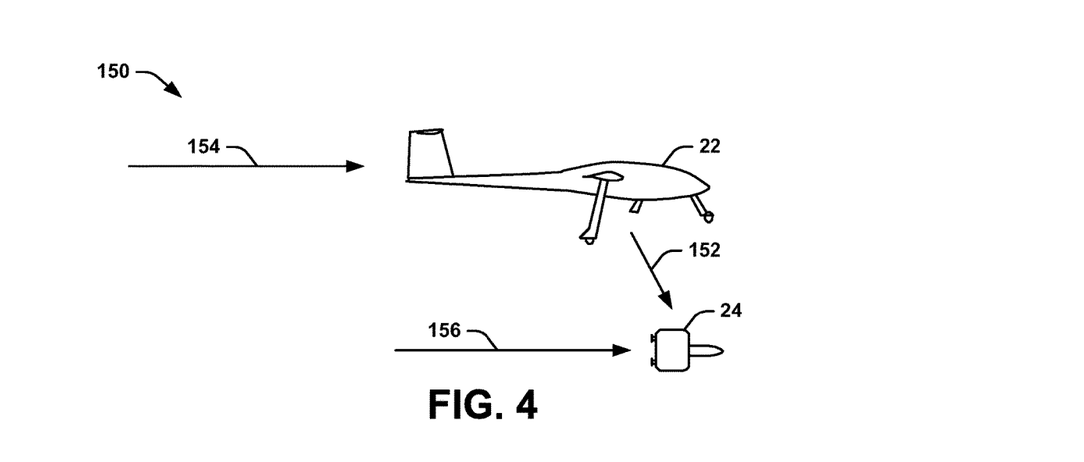
FIG. 4 illustrates an example diagram of a second stage of an aerial mission.

FIG. 4 illustrates an example diagram 150 of a second stage of an aerial mission. In the example of FIG. 4, the second stage can correspond to a detach stage. As an example, in response to achieving at least one of a predetermined altitude and a predetermined geographic location (e.g., an approximate location of at least one mission objective) during the takeoff and delivery stage, the singlecopter 24 can detach from the glider aircraft 22 during a detach stage, demonstrated in the example of FIG. 4 by an arrow 152. As an example, the detach stage can be based on situational awareness data associated with at least one of the glider aircraft 22 and the singlecopter 24, such as based on a known altitude or coordinate space (e.g., based on GNSS). As another example, at least one of the glider aircraft 22 and the singlecopter 24 can maintain contact with the base-station (e.g., based on at least one of the transceivers 60 and 66), such that the base-station can command detachment of the singlecopter 24 from the glider aircraft 22 during the detach stage. During the detach stage, the glider aircraft 22 can maintain forward momentum based on the propulsion that was provided by the singlecopter 24 during the takeoff and delivery stage, as demonstrated by the arrow 154. Similarly, the singlecopter 24 can maintain forward momentum during the detach stage based on the thrust provided via the rotor, as demonstrated by the arrow 156.

Figure 5:
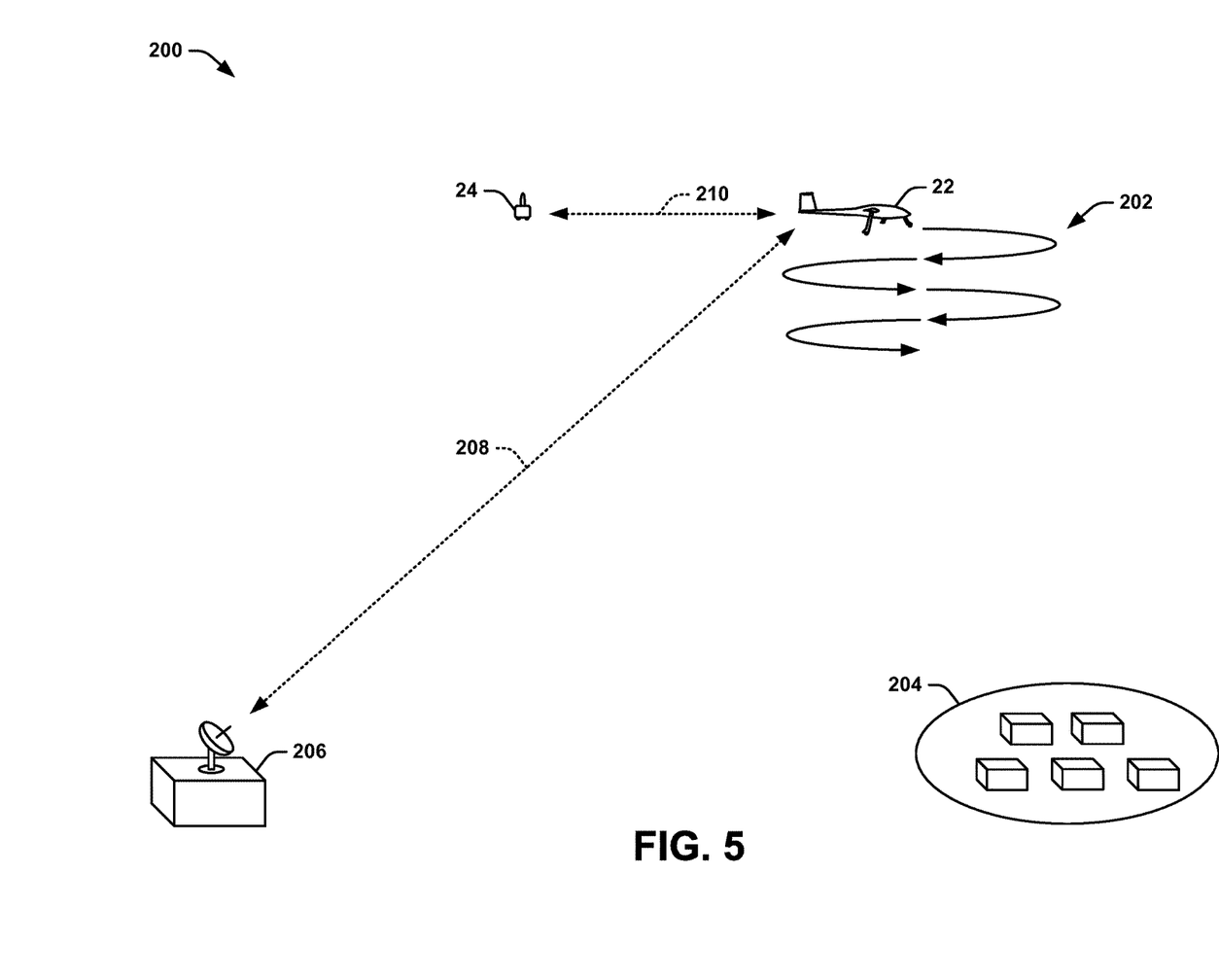
FIG. 5 illustrates an example diagram of a third stage of an aerial mission.

FIG. 5 illustrates an example diagram 200 of a third stage of an aerial mission. In the example of FIG. 5, the third stage can correspond to a mission objective stage. As an example, after the detach stage, the dual-aircraft system 12, as the separate components of the singlecopter 24 and the glider aircraft 22, can enter the mission objective stage. In the example of FIG. 5, the glider aircraft 22 is demonstrated as loitering in a gliding-flight mode, demonstrated by the arrows 202, at or near a geographic location of an objective site, demonstrated at 204. Therefore, in the gliding-flight mode, the glider aircraft 22 can be unassisted by any form of active (e.g., motorized or fuel-based) propulsion. During the mission objective stage, the glider aircraft 22 can be configured to perform the predetermined at least one mission objective associated with the objective site 204, such as based on the mission objective controller 62 in the glider control system 52. The mission objective(s) can include, for example, at least one of video surveillance of the objective site 204, imaging of the objective site 204, providing communications to the objective site 204, and/or delivering/launching ordnance toward the objective site 204.

In the example of FIG. 5, a base-station 206 is demonstrated as maintaining a wireless communication link with the glider aircraft 22 (e.g., via the transceiver 66), demonstrated as the dotted line 208. As an example, the glider aircraft 22 can be configured to generate SA data associated with the situational awareness of the glider aircraft 22 (e.g., including altitude and information regarding the objective site 204), and can transmit the SA data to the base-station 206 via the communications link 208. The base-station can thus be configured to transmit navigation controls to the glider aircraft 22 via the communications link 208 in response to the SA data. For example, the base-station 206 can include a user that can provide remote piloting of the glider aircraft 22 during the mission objective stage via the communications link 208. As another example, the base-station 206 can be configured to transmit mission objective control data to the glider aircraft 22 via the communications link 208, such as to control performance of the mission objective(s) with respect to the objective site 204. While the example of FIG. 5 demonstrates that the base-station 206 maintains a direct communications link 208 with the glider aircraft 22, it is to be understood that the communications link 208 can also be an indirect communications link, such as based on one or more interposing communications relays (e.g., vehicles, such as the singlecopter 24), and/or can be in response to a satellite communications signal.

In the example of FIG. 5, the singlecopter 24 is demonstrated as hovering in place during the mission objective stage, such as to maintain substantially close proximity with respect to the glider aircraft 22. The singlecopter 24 and the glider aircraft 22 are demonstrated in the diagram 200 as maintaining a wireless communications link, demonstrated by the dotted line 210, such as via the transceivers 60 and 66, respectively. For example, the glider aircraft 22 can transmit the SA data to the singlecopter 24 as well as the base-station 206 during the mission objective stage. Therefore, the glider aircraft 22 can transmit an indication of progress (e.g., completion) of the mission objective(s) and/or an indication of having achieved a critical altitude via the communications link 210 to the singlecopter 24. Therefore, in response to receiving the respective indication of completion of the mission objective(s) and/or the indication of the glider aircraft 22 having achieved the critical altitude, the singlecopter 24 can fly to the glider aircraft 22 to initiate the reattach stage.

While the singlecopter 24 is demonstrated as hovering in the example of FIG. 5, the singlecopter 24 can perform other activities during the mission objective stage. As another example, the singlecopter 24 can land/perch during the mission objective stage. As yet another example, the singlecopter 24 can be configured to perform other mission objective(s), such as while hovering or perching, or while flying in a pattern or to another predetermined geographic location. The mission objective(s) performed by the singlecopter 24 can be substantially similar to any of a variety of mission objectives similar to as described previously with respect to the glider aircraft 22 (e.g., video surveillance, imaging, communications, and/or ordnance delivery).

Figure 6:
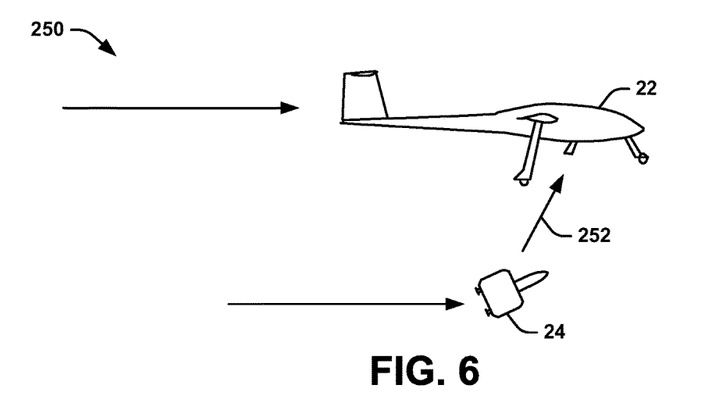
FIG. 6 illustrates an example diagram of a fourth stage of an aerial mission.

FIG. 6 illustrates an example diagram 250 of a fourth stage of an aerial mission. In the example of FIG. 6, the fourth stage can correspond to a mission objective stage. As described previously, in response to receiving the respective indication of completion of the mission objective(s) and/or the indication of the glider aircraft 22 having achieved the critical altitude, the singlecopter 24 can fly to the glider aircraft 22 to initiate the reattach stage. During the reattach stage, the singlecopter 24 can travel to the location of the glider aircraft 22, such as in a horizontal level-flight mode, and can mechanically reattach to the glider aircraft 22. In the example of FIG. 6, the singlecopter 24 is demonstrated as reattaching to the glider aircraft 22 via the mechanical linkage, as indicated by the arrow 252. For example, the mechanical linkage to which the singlecopter 24 can attach to the glider aircraft 22 can be the same mechanical linkage through which the glider aircraft 22 and the singlecopter 24 were attached during the takeoff and delivery stage. For example, the singlecopter 24 can substantially match the velocity, altitude, and trajectory associated with the gliding-flight of the glider aircraft 22 and can engage the mechanical linkage at a sufficiently close proximity. As another example, the singlecopter 24 can mechanically attach (e.g., via a mechanical means) to one or more tethers associated with the glider aircraft 22.

Accordingly, subsequent to reattachment during the reattach stage, the singlecopter 24 can again provide propulsion for the dual-aircraft system 12. As an example, the singlecopter 24 can again provide the propulsion for the dual-aircraft system 12 to lift the dual-aircraft system 12 to a subsequent predetermined altitude and/or to transport the dual-aircraft system 12 to a subsequent predetermined geographic location, such as proximal to the objective site 204. In response to the dual-aircraft system 12 achieving at least one of the subsequent predetermined altitude and the subsequent predetermined geographic location, the singlecopter 24 can once again detach from the glider aircraft 22 during a subsequent detach stage, such as similar to the diagram 150 in the example of FIG. 4. Therefore, the glider aircraft 22 can again proceed in a gliding-flight mode to implement the mission objective stage, such as similar to the diagram 200 in the example of FIG. 5. Accordingly, the dual-aircraft system 12 can substantially repeatedly perform one or more mission objectives based on repeatedly implementing the detach stage, the mission objective stage, and the reattach stage. As another example, upon reattachment of the singlecopter 24 to the glider aircraft 22 during the reattach stage, the singlecopter 24 can provide propulsion of the dual-aircraft system 12 to a predetermined landing site (e.g., at or near the base-station 206), and thus conclude the mission of the dual-aircraft system 12.

Figure 7:
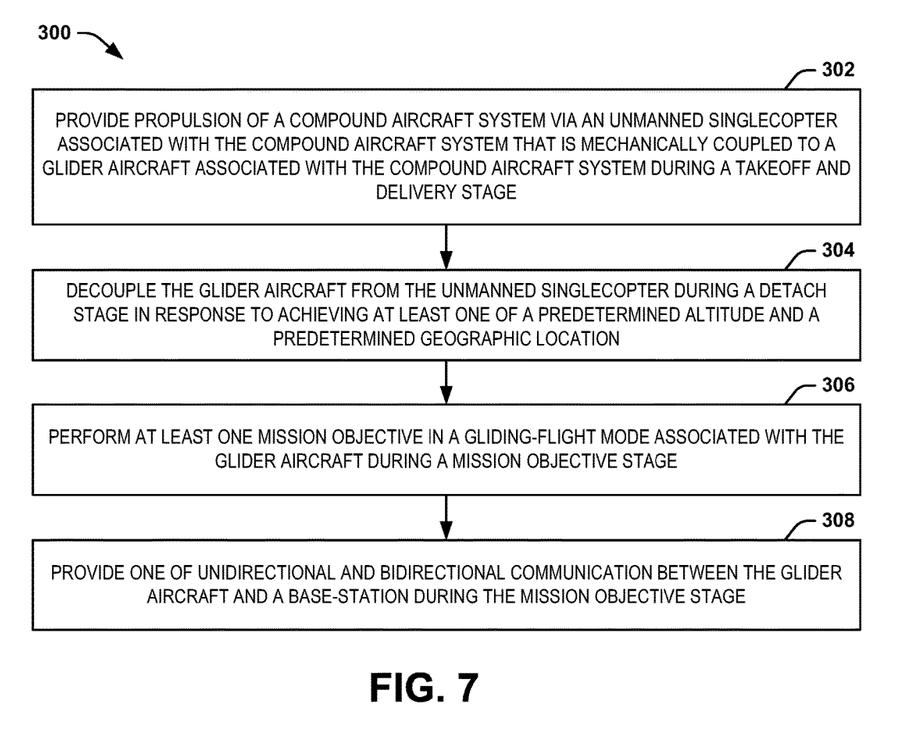
FIG. 7 illustrates an example of a method for performing an aerial mission.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates an example of a method 300 for performing an aerial mission. At 302, propulsion of a dual-aircraft system (e.g., the dual-aircraft system 12) is provided via an unmanned singlecopter (e.g., the singlecopter 24) associated with the dual-aircraft system that is mechanically coupled to a glider aircraft (e.g., the glider aircraft 22) associated with the dual-aircraft system during a takeoff and delivery stage (e.g., demonstrated in the diagram 100). At 304, the glider aircraft is decoupled from the unmanned singlecopter during a detach stage (e.g., demonstrated in the diagram 150) in response to achieving at least one of a predetermined altitude and a predetermined geographic location. At 306, at least one mission objective is performed in a gliding-flight mode associated with the glider aircraft during a mission objective stage (e.g., demonstrated in the diagram 200). At 308, one of unidirectional and bidirectional communication (e.g., via the transceiver 66) is provided between the glider aircraft and a base-station (e.g., the base-station 206) during the mission objective stage.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A dual-aircraft system comprising:
a glider aircraft configured to perform at least one mission objective in a gliding-flight mode during a mission objective stage; and
an unmanned singlecopter configured to couple to the glider aircraft via a mechanical linkage to provide propulsion for the glider aircraft during a takeoff and delivery stage, the unmanned singlecopter being further configured to decouple from the glider aircraft during a detach stage in response to achieving at least one of a predetermined altitude and a predetermined geographic location to provide the gliding-flight mode associated with the glider aircraft, such that the glider aircraft subsequently enters the mission objective stage, wherein the unmanned singlecopter comprises a singlecopter control system configured to command the unmanned singlecopter to travel to a location associated with the glider aircraft and to mechanically reattach to the glider aircraft during a reattachment stage in response to receiving situational awareness (SA) data that is indicative of a critical altitude associated with the glider aircraft.

2. The system of claim 1, wherein the glider aircraft comprises a glider control system comprising a mission objective controller configured to implement the at least one mission objective based on mission objective control data, an SA sensor system configured to generate the SA data, and a transceiver configured to transmit the SA data.

3. The system of claim 2, wherein the singlecopter control system comprises a mission objective controller configured to control decoupling of the glider aircraft from the unmanned singlecopter at at least one of the predetermined altitude and the predetermined geographic location, and a transceiver configured to receive the SA data associated with the glider control system.

4. The system of claim 1, wherein the unmanned singlecopter is configured to reattach to the glider aircraft via one of the mechanical linkage and a cable system associated with the glider aircraft.

5. The system of claim 2, wherein the transceiver associated with the glider control system is configured to maintain wireless communication with a base-station configured to at least one of transmit the mission objective control data to the transceiver associated with the glider control system and receive the SA data from the transceiver associated with the glider control system.

6. The system of claim 1, wherein the at least one mission objective is a first at least one mission objective, wherein the unmanned singlecopter is configured to perform at least one second mission objective during the mission objective stage.

7. The system of claim 1, wherein the unmanned singlecopter is configured to travel to a location associated with the glider aircraft and to mechanically reattach to the glider aircraft during a reattach stage in response to the glider aircraft achieving a critical altitude.

8. The system of claim 7, wherein the unmanned singlecopter is configured to at least one of hover and perch during the mission objective stage, and to monitor wireless communications associated with the glider aircraft during the mission objective stage to determine a time to enter the reattach stage.

9. The system of claim 7, wherein the unmanned singlecopter is configured to provide propulsion for the glider aircraft subsequent to the reattach stage, to decouple from the glider aircraft during a subsequent detach stage in response to achieving at least one of a subsequent predetermined altitude and a subsequent predetermined geographic location to provide the gliding-flight mode associated with the glider aircraft, such that the glider aircraft subsequently re-enters the mission objective stage.

10. The system of claim 7, wherein the unmanned singlecopter is configured to provide propulsion for the glider aircraft subsequent to the reattach stage to facilitate travel of the dual-aircraft system to a predetermined landing site.

* * * * *